J. CORNWELL.
Flour Bolt.

No. 88,137.

2 Sheets—Sheet. 1.

Patented March 23, 1869.

Witnesses
J. L. Coburn

Inventor
Jacob Cornwell
Coburn & Means
Attys

2 Sheets—Sheet 2.
J. CORNWELL.
Flour Bolt.
No. 88,137.    Patented March 23, 1869.
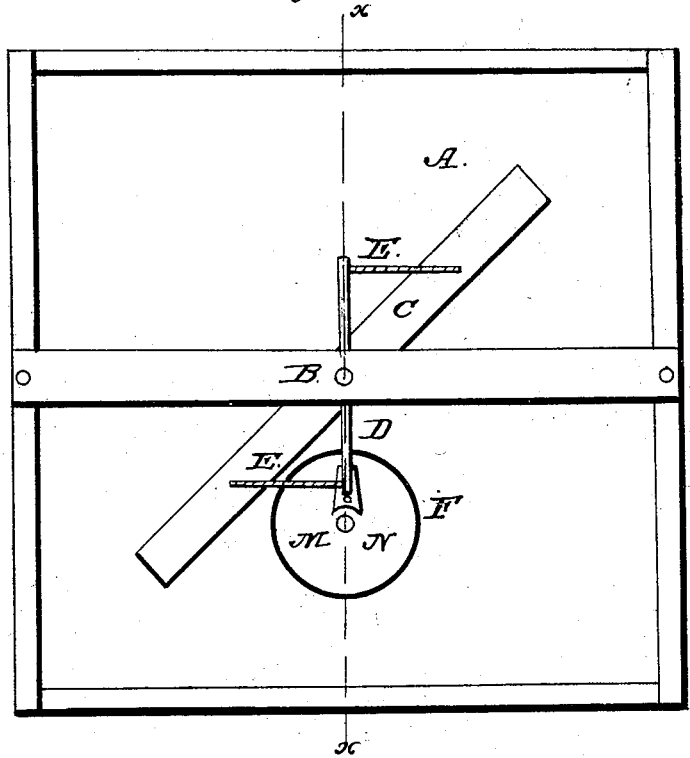
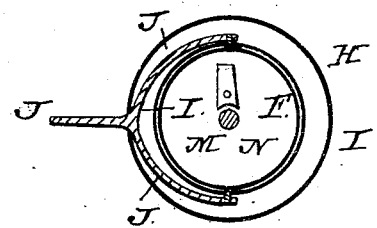
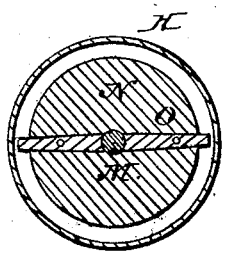
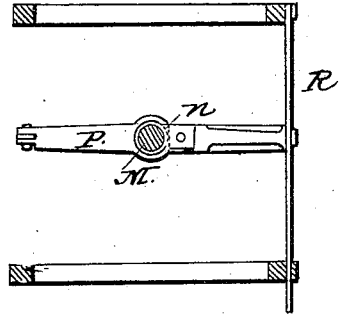
Witnesses
J. L. Coburn
J. C. Bruns
Inventor
Jacob Cornwall
Per Hoban & Maus
Attys.

United States Patent Office.

JACOB CORNWELL, OF KALAMAZOO, MICHIGAN, ASSIGNOR TO HIMSELF, DAVID B. MERRILL, AND WILLIAM H. McCOURTIE, OF THE SAME PLACE.

Letters Patent No. 88,137, dated March 23, 1869.

IMPROVED BOLT-FEEDER.

The Schedule referred to in these Letters Patent and making part of the same.

*To all whom it may concern:*

Be it known that I, JACOB CORNWELL, of Kalamazoo, in the county of Kalamazoo, in the State of Michigan, have invented a new and useful Improvement in Silent Bolt-Feeders; and I do hereby declare and make known that the following is a full, clear, and exact description of the same, reference being had to the accompanying drawings, and the letters and figures marked thereon, which form part of this specification.

My said invention relates to a novel combination of a feeding-device with a flour-cooler and a bolt, so arranged that the rake of the cooler conveys the flour from the cooler into the silent feeder, through which it passes, and through a suitable conveyer into the bolt, as hereinafter more fully set forth.

My said invention further consists in a novel device for regulating the feeder aforesaid, whereby the passage of the flour through the same into the bolt can be controlled and varied at pleasure.

To enable those skilled in the art to understand how to construct and use my said invention, I will proceed to describe the same with particularity, making reference, in so doing, to the aforesaid drawings, in which—

Figure 3 is a plan or top view of my said invention;

Figure 4 is a horizontal plan section, taken at the line $z$ in fig. 1;

Figure 5 is a plan section at the line $w$ in said fig. 1, seen from below; and

Figure 6 is a plan view of the feed-regulating device, being shown in section through fig. 2, at line $v$.

Similar letters of reference, in the several figures, denote the same parts of my said invention.

A represents the flour-cooler, into which the flour is discharged as it comes from the grinding-stones, said cooler being of a suitable size, according to the capacity of the mill, at the centre of which is a revolving shaft, B, upon which is a stirrer, or rake, which revolves upon the floor of the cooler, stirring up the flour, and gradually and continuously raking the same into an opening in the floor of the cooler, below which is arranged a vertical cylinder, marked F.

In order that, in revolving the shaft of the rake B, the power may be applied near the ends of the said rake, a bar, D, is attached to the shaft, whose ends are attached to the rake by cords E E, as shown in fig. 3.

Figure 2:
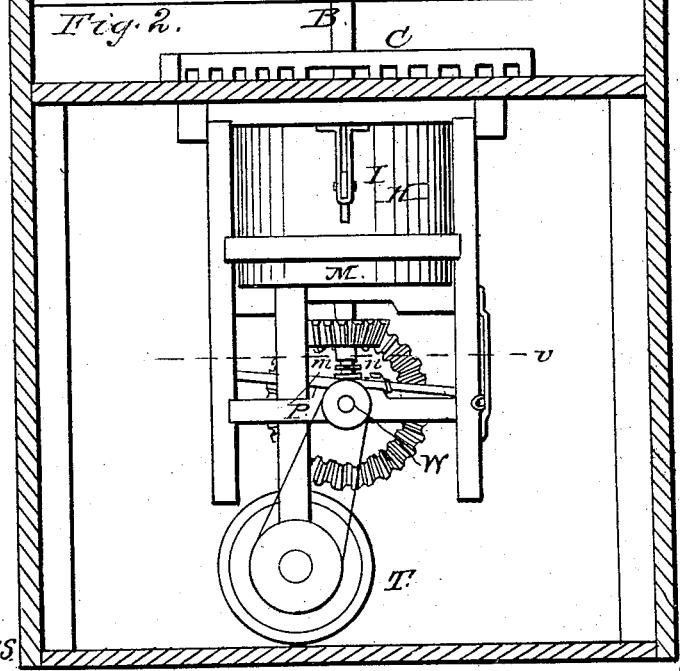
Figure 2 is a side elevation of the same, taken at right angles with the line $x$ aforesaid, the case being removed, as shown at the line $y$ in fig. 1.

In the centre of said cylinder, or hoop F, there is a vertical revolving shaft, M, whose foot rests in a suitable step on a cross-bar, P, said shaft M being revolved by means of the shaft W and the bevelled-gear wheel, shown in fig. 2.

Figure 1:
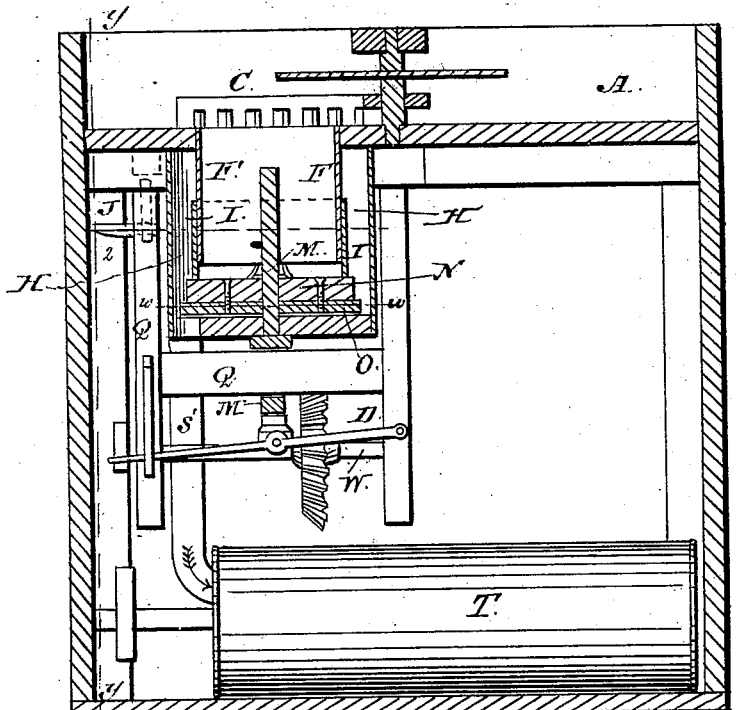
Figure 1 represents a vertical central section of my invention, taken at the line $x$ in fig. 3.

Upon said shaft M, a short distance below the end of the hoop F, a circular disk, N, is secured, extending out beneath the edge of the hoop F and the adjustable sleeve I, upon said hoop, as shown in fig. 1.

The aforesaid sleeve I is provided with a lever, J, by means of which the sleeve I may be moved up or down, to regulate the space between its lower end and said disk N, to regulate the feed of the flour into the bolt, as hereinafter described.

H represents a cylinder enclosing the hoop F, being securely attached to the lower side of the cooler, as shown, and extending down some distance lower than said hoop F and sleeve I, into the lower end of which is fitted a tight bottom, L, through the centre of which passes the shaft M.

The strip O, secured to the under side of the revolving disk N, is so arranged as to sweep the bottom, L, of the hoop, or cylinder H.

The bar P, which supports the foot of the shaft M, is hinged at one end to the frame Q, and its opposite end is secured to a lever, R, having a vertical movement, so that the feed of the apparatus can also be regulated by moving the shaft M up, or allowing it to drop down, thus bringing the revolving platform, or disk N, nearer to or further from the lower end of the hoop F. When this device is employed, the sleeve I may be dispensed with.

Near the foot of the shaft M, an annular groove, $m$, is made, into which a plate, $n$, secured upon the bar P, enters, so that when the bar P has been raised, and afterwards lowered, the shaft will be drawn down, at the downward movement of the bar, thus keeping the shaft upon the bar, and insuring the desired regulation of the feed which the lowering of the disk N would produce.

In the bottom of the cylinder H, a hole, $l$, is made, as seen in fig. 1, which is provided beneath with a spout, or conveyer, S, which leads into the end of a bolt, marked T.

The power for operating the mill-rake, or stirrer C, and also for revolving the shaft M and its platform N, may be applied in any suitable manner.

When the flour is being fed or discharged into the cooler A, and the rake-shaft M and the bolt T are revolved, the flour is gradually and in regular quantities raked into the cylinder F, falling upon the revolving table, or disk M.

The motion of said disk causes the flour to be distributed uniformly around at the edge, to go out between the disk and the sleeve I, or between said disk and the hoop F, according as one or the other of the modes herein shown for regulating the feed is employed.

The flour then falls upon the bottom, L, of the outer hoop, and the revolving arm O, upon the under side of the disk, sweeps the flour into the spout S, through the opening $l$ aforesaid, into the bottom, L, whence it passes into the bolt, as indicated by the arrows in fig. 1.

Having described the nature, construction, and operation of my invention, I will now specify what I desire to secure by Letters Patent, and claim as my invention.

1. I claim the combination of the rake C, hoop F, cylinder H, with its bottom, L, revolving disk N, spout S, and bolt T, all arranged as and for the purposes set forth.

2. I claim the combination of the hoop F, shaft M, revolving platform N, and the movable cross-bar P, supporting said shaft, arranged to operate in the manner shown and described.

3. I claim, in combination with the shaft M and revolving disk N, the adjustable supporting-bar P and lever R, arranged to operate in the manner and for the purposes specified.

JACOB CORNWELL.

Witnesses:
 ISAAC A. BROWN,
 D. H. HAINES.